United States Patent
Wehner

(10) Patent No.: US 10,274,227 B2
(45) Date of Patent: Apr. 30, 2019

(54) THERMOSYPHON COOLING FOR OVERHEAT PROTECTION

(71) Applicant: Thomas Richard Wehner, Santa Fe, NM (US)

(72) Inventor: Thomas Richard Wehner, Santa Fe, NM (US)

( * ) Notice: Subject to any disclaimer, the term of this patent is extended or adjusted under 35 U.S.C. 154(b) by 256 days.

(21) Appl. No.: 15/294,760

(22) Filed: Oct. 16, 2016

(65) Prior Publication Data

US 2018/0106504 A1    Apr. 19, 2018

(51) Int. Cl.
| | |
|---|---|
| F24S 90/10 | (2018.01) |
| F24S 90/00 | (2018.01) |
| F24S 10/90 | (2018.01) |
| F24S 40/55 | (2018.01) |
| F24S 10/30 | (2018.01) |
| F24S 10/50 | (2018.01) |
| F24S 10/40 | (2018.01) |

(52) U.S. Cl.
CPC ............... *F24S 90/10* (2018.05); *F24S 10/90* (2018.05); *F24S 40/55* (2018.05); *F24S 90/00* (2018.05); *F24S 10/30* (2018.05); *F24S 10/40* (2018.05); *F24S 10/50* (2018.05)

(58) Field of Classification Search
USPC ...................................... 126/639; 165/58–64
See application file for complete search history.

(56) References Cited

U.S. PATENT DOCUMENTS

| | | | | |
|---|---|---|---|---|
| 3,623,497 | A * | 11/1971 | Kaske | F15C 1/20 137/816 |
| 4,049,046 | A * | 9/1977 | Worthington | F24F 5/0046 165/48.2 |
| 4,102,325 | A | 7/1978 | Cummings | |
| 4,120,172 | A * | 10/1978 | Pierce | F25B 1/00 165/104.31 |
| 4,271,103 | A | 6/1981 | McAlister | |
| 4,397,305 | A | 8/1983 | Keefe | |
| 4,399,807 | A | 8/1983 | Buckley | |
| 4,473,063 | A | 9/1984 | Mackensen | |
| 4,505,262 | A | 3/1985 | Eaton | |
| 4,599,994 | A * | 7/1986 | Cole | F24S 90/10 126/588 |
| 7,398,779 | B2 * | 7/2008 | Bowen | F24S 10/73 126/639 |
| 7,798,140 | B2 | 9/2010 | van Houten | |
| 7,823,582 | B2 | 11/2010 | Harrison | |
| 7,913,684 | B2 | 3/2011 | Butler | |
| 8,220,453 | B2 * | 7/2012 | Bourke | F24D 17/0021 126/638 |
| 8,459,248 | B2 * | 6/2013 | Milder | F24F 5/0046 126/589 |
| 8,726,898 | B2 * | 5/2014 | Torrens Rasal | F24S 10/742 126/589 |
| 8,820,315 | B2 * | 9/2014 | Jackman | F24D 11/003 126/591 |
| 9,110,477 | B2 * | 8/2015 | Wehner | G05D 23/1346 |

(Continued)

*Primary Examiner* — Nina Bhat

(57) ABSTRACT

This thermosyphon cooling system cools fluid by thermosyphon to prevent overheating at a solar collector when forced circulation stops. The introduction of the fluidic diode in the thermosyphon heat dump flow path affords more design and installation options, higher reliability, and the opportunity to manufacture solar collectors of less expensive alternative materials.

6 Claims, 7 Drawing Sheets

(56) References Cited

U.S. PATENT DOCUMENTS

| | | | |
|---|---|---|---|
| 9,541,307 B2* | 1/2017 | Jackman | H02S 40/44 |
| 9,689,587 B1* | 6/2017 | Poulter | F24S 50/40 |
| 2003/0159690 A1* | 8/2003 | Butler | F24J 2/4627 |
| | | | 126/584 |
| 2010/0000710 A1 | 1/2010 | Henke | |
| 2010/0059047 A1* | 3/2010 | Bourke | F24S 40/58 |
| | | | 126/663 |
| 2010/2126598 | 5/2010 | Peric | |
| 2011/0232862 A1 | 9/2011 | Gofton | |
| 2012/0247455 A1* | 10/2012 | Gurin | F24D 11/0221 |
| | | | 126/638 |
| 2015/0168020 A1* | 6/2015 | Wehner | F24S 40/55 |
| | | | 126/714 |

\* cited by examiner

THERMOSYPHON COOLING FOR OVERHEAT PROTECTION

BACKGROUND OF THE INVENTION

1. Field of the Invention

The present invention relates to fluidic systems in which a solar thermal collector or similar flowing-fluid-heating device may experience a loss of forced circulation and require cooling to prevent damage.

2. Description of the Prior Art

Some solar thermal collectors for hot water and space heating can overheat and be damaged when forced circulation stops whether by accident, design, failure or fault. The most common situations arise when the fluidic system pump stops due to an electrical power failure or control system actions. Drainback solar thermal systems avoid overheating damage by allowing the fluid to drain out of the collectors. Non-drainback systems retain the fluid in the collector and in the hot sun can continue to heat the fluid in the collector to extremes creating the potential for damage.

One of the ways of arresting this heat up for non-drainback systems is to provide a heat dump flow path that becomes available to the solar collector when forced circulation stops and that cools the fluid passively by thermosyphon. This thermosyphon heat dump flow path is parallel with the solar collector flow path. A check valve included in the thermosyphon heat dump flow path closes to prevent flow through the thermosyphon heat dump flow path during forced circulation and opens to allow flow through the thermosyphon heat dump flow path when forced circulation stops. Because the check valve must open by gravity or by very low thermosyphon pressure, spring-type check valves cannot be used. Very few check valve types can work in this thermosyphon heat dump flow path. The swing check valve is one that can be used in this situation. However, the swing check can only operate horizontally. Some ball type check valves can also be used, but only vertically. These orientation requirements puts severe limits on how the thermosyphon heat dump flow paths can be designed and installed because the section of piping with the check valve is constrained to being horizontal or vertical, and solar collectors are generally installed with a slope. In addition, the swing check and ball check valves have moving parts that can fail mechanically. A different approach is necessary for the thermosyphon heat dump flow path to function at different angles and more reliably. The present invention introduces a new, simple, inexpensive, and more reliable apparatus that utilizes the fluidic diode instead of the check valve in the thermosyphon heat dump flow path.

U.S. Pat. No. 815,279 discloses an automated over-temperature protection system that uses a pressure vessel near the outlet of the solar collector. " . . . in the event that fluid in the solar energy absorber vaporizes, the fluid is forced out of the solar energy absorber and into the pressure vessel." This protection system fails to prevent boiling before it starts. The allowed boiling may damage the system or fluid in the system.

U.S. Pat. No. 7,823,582 discloses an automated solar collector temperature controller, which opens dampers to the air space of a flat plat solar collector. This protection system works only for flat plate solar collectors, and compromises the thermal integrity of the solar collector with openings and mechanical dampers that wear and eventually fail to close completely or properly.

U.S. Pat. No. 7,913,684 discloses an automated protection system to remove vapor from a solar collector and indirectly cool it should fluid boiling occur in the solar collector in a pressurized solar thermal heating system. This system fails to prevent boiling. The patent also adds dampers to the flat plate collector in the same fashion as the patent above. This damper system works only for flat plate solar collectors, and compromises the thermal integrity of the solar collector with openings and mechanical dampers that wear and eventually fail to close completely or properly.

U.S. Pat. No. 4,102,325 discloses an automated solar collector temperature control system that uses a thermosyphon, a valve, and additional tubing integrated into and attached to the solar collector. This system is expensive and complex.

U.S. Pat. No. 8,459,248 discloses a solar heating and cooling system that allows a thermosyphon loop to cool the fluid in a solar collector in pump-off situations. This system requires a check valve with its associated limitations and a shield.

U.S. Pat. No. 5,303,275 discloses the use of a fluidic diode in a boiling water nuclear reactor to augment natural circulation. This application is only for boiling water reactors and cannot be directly applied to solar thermal collectors and other flowing-fluid-heating devices.

SUMMARY OF THE INVENTION

The present invention is an apparatus and corresponding method for a closed-loop fluidic system that provides overheat protection via a thermosyphon heat dump flow path that is parallel to the flow path through a solar collector and that on the cessation of forced circulation allows fluid in the solar collector to be cooled at any angle by thermosyphoning. The thermosyphon heat dump flow path is comprised of a heat dump and a fluidic diode interposed between the inlet and outlet of the solar collector. During forced circulation, the normal system operating mode, the fluidic diode prevents upward flow through the thermosyphon heat dump flow path. Flow only goes through the solar collector. When forced circulation stops, natural circulation commences to cool the solar collector with the fluidic diode now allowing downward flow through the thermosyphon heat dump flow path. The heat dump is a heat exchanger and may be liquid-to-air, liquid-to-liquid or liquid-to-solid, active or passive, powered or non-powered. Options include finned tubes, fan coils, radiators, liquid baths, shell-and-tube, plate-type, and plate-fin, among others. The invention solves the overheating problem, removes orientation restrictions on the one-way fixture for the thermosyphon heat dump flow path, and is more reliable. Embodiments of the invention can be completely passive, a great advantage when power is lost. When the design and installation include horizontal or vertical components that allow the use of either the fluidic diode or the check valve, then either may be incorporated in the thermosyphon heat dump flow path.

The object of the present invention is to improve overheat protection for solar thermal collectors experiencing a loss of forced circulation by incorporating the fluidic diode into the thermosyphon heat dump flow path. Reliability is increased because the fluidic diode has no moving parts. A greater number of solar collector designs and installations can thus be protected because the fluidic diode functions in any orientation. Another object of the present invention is to enable the manufacture of solar collectors out of much less expensive materials, such as plastic, which could be easily damaged if not protected from overheating. Note that a plastic solar collector would have to also be protected from overheating during forced circulation with another separate overheat protection device or a control system because the present invention affords overheat protection only when forced circulation stops. Another object of the present invention is to improve the appearance of thermosyphon heat dump flow path plumbing by streamlining the piping with the use of the fluidic diode and by allowing the thermosyphon heat dump flow path to be integrated into the solar collector itself.

Figure 1:
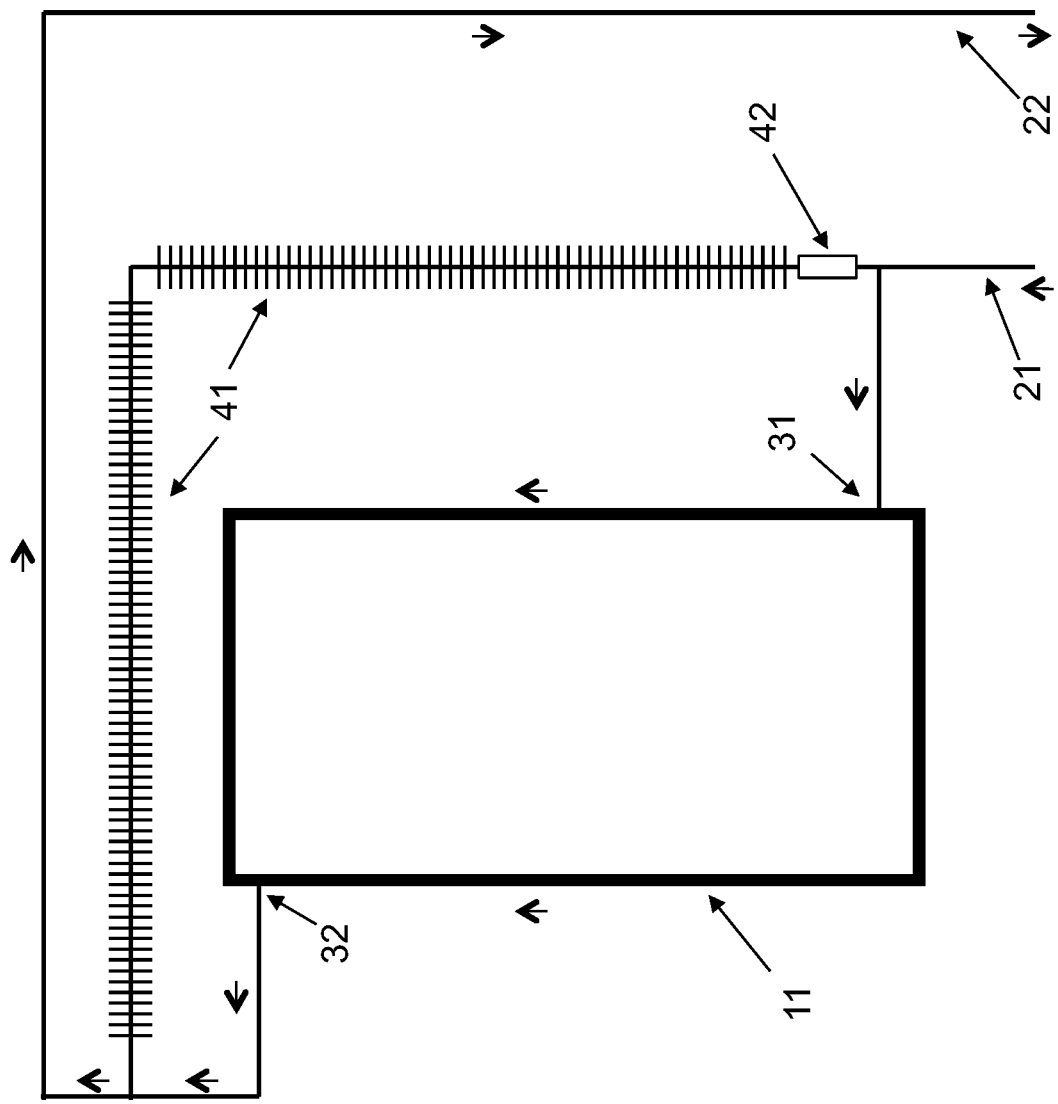
FIG. 1 shows a schematic for a flat plate solar collector and a parallel thermosyphon heat dump flow path with flow indicated for forced circulation.

Drawings are not to scale. Arrows without adjacent numbers show the direction of flow. All piping in the figures is insulated unless otherwise noted.

DETAILED DESCRIPTION OF THE INVENTION

1. Definitions

Fluidic system. "Fluidic system" is defined, herein, as a system comprising fluid, components and piping that come in contact with the fluid, and components for monitoring or controlling the system. A fluidic system may be open or closed. A fluidic system may be a subsystem of a larger fluidic system.

Piping. "Piping" is defined, herein, as a system of joined and fluid-coupled fluidic conduits through which fluid may flow from one component of a fluidic system to another. Piping includes, but is not limited to, pipes, tubes, hoses, manifolds, connectors, such as tee's or elbows, and the means for joining them to each other and to components. Piping may be rigid or flexible. Piping connections may be welded, bolted-flange, threaded, soldered, union-joint, pressure-fit, push-fit, fitting-type, compression-type, heat-welded, heat-soldered, clamped, glued, or accomplished with other joining methods.

Flow path. "Flow path" is defined, herein, as an assembly of joined and fluid-coupled fluidic system components, connectors and piping through which fluid may flow from one component or connector to the next. A flow path may be a sub-path of a larger flow path.

Interposed. "Interposed," in reference to piping and components of a fluidic system, is defined as being inserted into, joined to, and fluid coupled to, a flow path; or being inserted between one set of components and/or piping and another set of components and/or piping, and joined to and fluid coupled to them.

2. The Present Invention

The present invention solves the loss-of-forced-circulation overheating problem for solar thermal collectors in a new way. In particular, the introduction of the fluidic diode in a thermosyphon heat dump flow path opens up the design and installation options for thermosyphon-based overheat protection systems and increases system reliability. The present invention is an apparatus and corresponding method for a fluidic system that provides a thermosyphon heat dump flow path that is parallel to the flow path through a solar collector and that on the cessation of forced circulation allows fluid in the solar collector to be cooled at any angle by thermosyphoning to prevent the device from overheating. The thermosyphon heat dump flow path is comprised of a heat dump and a fluidic diode with the top of the flow path near the outlet of the solar collector and the bottom of the flow path near the inlet of the solar collector. During forced circulation, the normal system operating mode, the fluidic diode prevents upward flow through the thermosyphon heat dump flow path. Flow only goes through the solar collector. When forced circulation stops, natural circulation commences with the fluidic diode now allowing downward flow through the thermosyphon heat dump flow path. The invention allows thermosyphon overheating protection systems to be designed and installed in ways they could not before.

The fluidic diode is completely different from a check valve. The fluidic diode uses the fluid itself turning back into or onto itself to impede flow in one direction and to not impede flow in the other direction: the check valve uses a hinged gate, disc, piston or loose ball that plugs or closes an orifice to impede flow in one direction and unplugs or opens the orifice to not impede flow in the other direction. The fluidic diode has no moving parts whereas the check valve has moving parts. The check valve is characterized by its cracking pressure: the fluidic diode by its diodicity. There are several types of fluidic diodes: the vortex diode, the rectifier diode, and the scroll diode among others. All fluidic diodes types work and can be applied in the present invention, and choices among them depend on the configuration and geometry of the system design. The principal advantage of the fluidic diode over the check valve in this application is that it functions in any orientation. The plumbing industry, of which solar thermal plumbing is a part, has a great deal of experience with check valves, but almost none with fluidic diodes.

During forced circulation, the fluid in a thermosyphon heat dump flow path is stagnant and relatively cool. So, during forced circulation, the solar collector is operating as if the thermosyphon heat dump flow path is not even there. The solar collector is operating normally, soaking up heat from the sun, with the fluid flowing through the collector and delivering its heat to downstream tanks, heat exchangers, or other heat sinks or end uses, and returning to the solar collector for more heat.

The situation changes dramatically when forced circulation stops. Consider the situation in which the solar collector is on the left and the thermosyphon heat dump flow path is on the right. With the relatively hot fluid on the left side and the relatively cool fluid on the right side, thermosyphoning, or natural circulation, will commence when the fluid density on the right side is greater that the fluid density on the left side by enough to create a gravity-driven buoyancy pressure that overcomes the frictional forces. Fluid sinks on the right side and rises on the left side. Thus, hot fluid in the solar collector moves out of the device and into the thermosyphon heat dump flow path where it is cooled. This thermosyphoning can be steady or intermittent, but the net effect is to reduce and limit the fluid temperature and thereby prevent overheating.

3. Embodiments of the Present Invention

FIG. 1 shows a schematic of the present invention for a flat plate solar collector 11 in forced-circulation mode. Only the supply piping 21 to the solar collector, return piping 22 from the solar collector, the inlet to the solar collector 31, the outlet from the solar collector 32, the heat dump 41, and the fluidic diode 42 are shown in the figure. The balance of the closed-loop fluidic system that typically includes a pump, an expansion tank and the like are not shown. The thermosyphon heat dump flow path is comprised of the heat dump component 41 and the fluidic diode component 42. All piping except for the thermosyphon heat dump flow path is insulated.

During forced-circulation operation, fluid flows from the supply piping 21 into the solar collector inlet 31. Flow does not go through the fluidic diode 42 because the flow in this direction is impeded. There is no flow through the thermosyphon heat dump flow path 41 and 42. Fluid in this flow path 41 and 42 is stagnant and cool relative to the fluid in the solar collector. Flow continues through the solar collector that heats the fluid that then exits at the solar collector outlet 32. Flow continues to the return piping 22 from the solar collector.

Figure 2:
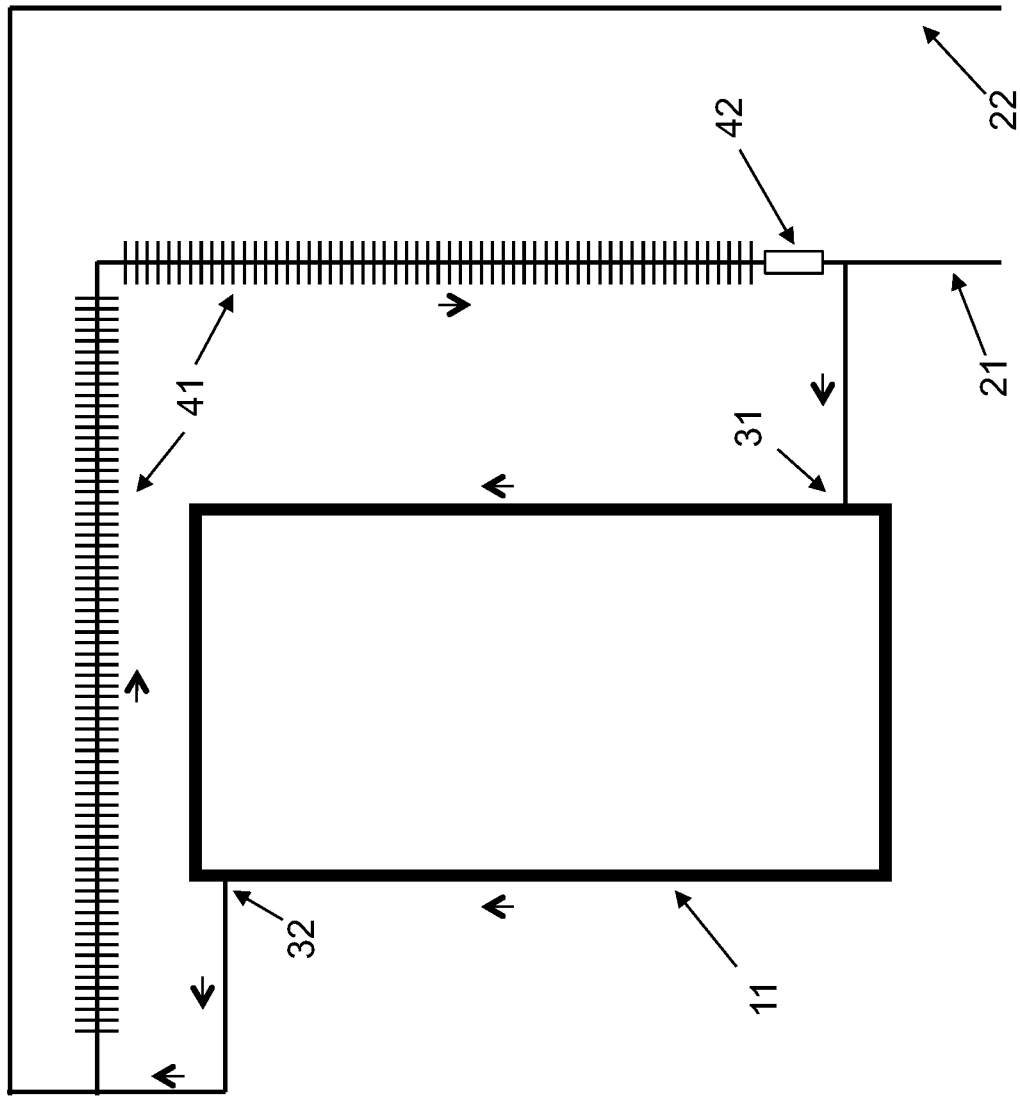
FIG. 2 shows a schematic for a flat plate solar collector and the parallel thermosyphon heat dump flow path with flow indicated for natural circulation.

FIG. 2 shows the same schematic but for the situation in which forced circulation has ceased. There is no flow in the supply piping 21 or the return piping 22. However, there is now natural circulation flow, or thermosyphoning, up through the solar collector 11 and down through the thermosyphon heat dump flow path 41 and 42. The fluidic diode 42 now allows flow through in the opposite direction from forced circulation flow. With the heat dump 41 sized to disperse to the ambient air as much heat as the solar collector is gaining from the sun, the natural circulation will continue and by so doing will limit the fluid temperature and prevent overheating.

The fluidic diode 42 can be oriented at any angle and still function. Further, the fluidic diode makes it possible and practical to integrate the thermosyphon heat dump flow path into the solar collector itself and to make the solar collector out of plastic or other inexpensive materials.

One design that derives from the schematics in FIGS. 1 and 2 is a free-standing, sloped conventional flat plate solar collector with internal top and bottom headers with a finned tube heat dump going diagonally across the back side of the collector with an inline fluidic vortex diode (not shown). The thermosyphon heat dump flow path would be interposed between the bottom inlet header on either side of the collector and the top outlet header on the opposite side. In the event of a pump failure, natural circulation through the solar collector and the thermosyphon heat dump flow path would commence and keep the fluid temperature low enough to prevent overheating, fluid boiling and collector damage. Many other designs can be derived from the schematics in FIGS. 1 and 2.

The same collector above but flush-mounted to a pitched roof could not easily have finned tubes crossing the back side of the collector. For such an installation, finned tubes can be run across the roof along the top of the collector and down one side with an inline fluidic scroll diode. A short insulated piping extension interposed between the outlet of the solar collector and the inlet to the thermosyphon heat dump flow path would be added. If the flush-mounted collector were on a low sloped roof, such as a 3:12 pitch, the outlet piping extension would go upward, vertically away from the roof or flush with the roof, and be insulated to provide more vertical height of hot fluid and consequently more thermosyphon driving pressure to move the fluid more quickly in natural circulation. Plumbing these thermosyphon heat dump flow paths with a check valve instead is more difficult, and would create unsightly piping runs on the roof.

Figure 3:
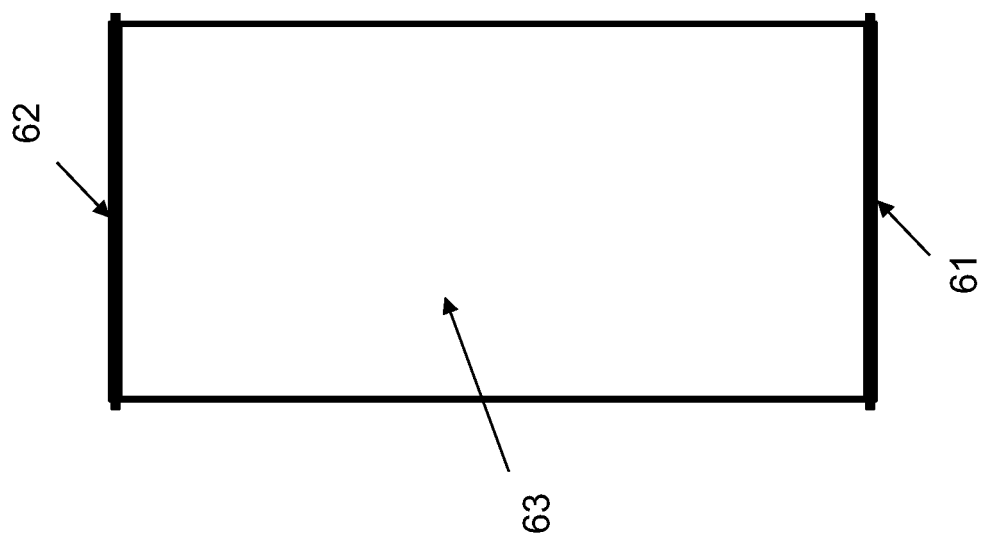
FIG. 3 shows a top view of a flat plate solar collector design.

Passively self-cooling solar collectors become possible and practical with the present invention, and FIG. 3 depicts one, a plastic collector approximately 4 feet wide by 8 feet high, typical dimensions for a flat plate collector. FIG. 3 shows a top view of the collector. The bottom/inlet header 61 has a connector on either side to allow multiple collectors to be connected together. Likewise, for the top/outlet header 62. The inlet to the solar collector can be on either side of the inlet header depending on the installation. The outlet from the solar collector can also be on either side of the outlet header but is typically on the opposite side from the inlet. Glazing 63 covers most of the sun-ward facing collector.

Figure 4:
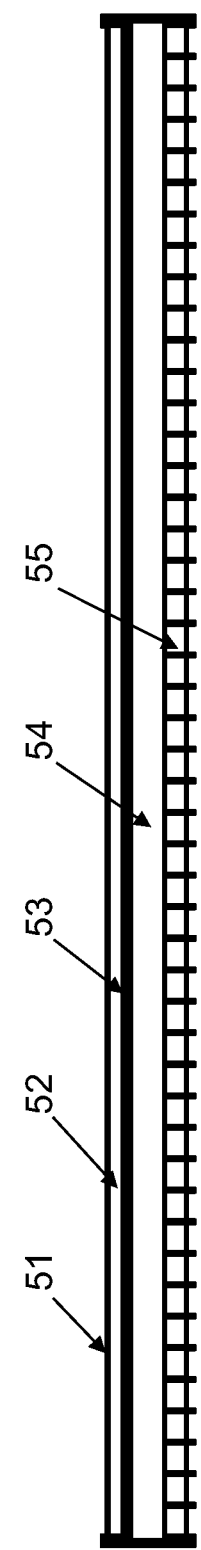
FIG. 4 shows a cross-sectional end view of a flat plate solar collector design with integrated thermosyphon heat dump flow path.

FIG. 4 shows a cross-sectional end view of this vertical harp-type plastic solar collector design. This collector incorporates many thermosyphon heat dump flow paths 55 on the back side of the solar collector. Glazing 51 is at the top. Below that is an air gap 52. Below that is a heat absorbing layer 53 that contains small vertical flow paths or channels (coming out of the page and not individually shown). Below the heat-absorbing layer 53 is insulation 54. Below that is a layer of individual thermosyphon flow paths 55 (coming out of the page), capable of dumping heat out from the back side of the solar collector into the ambient air. Above and below these channels on either end of the collector are the outlet and inlet headers open to all the flow paths through the collector, respectively. For forced circulation, fluid flowing through the heat-absorbing small channel layer 53 carries off the absorbed solar heat to end uses.

Figure 5:
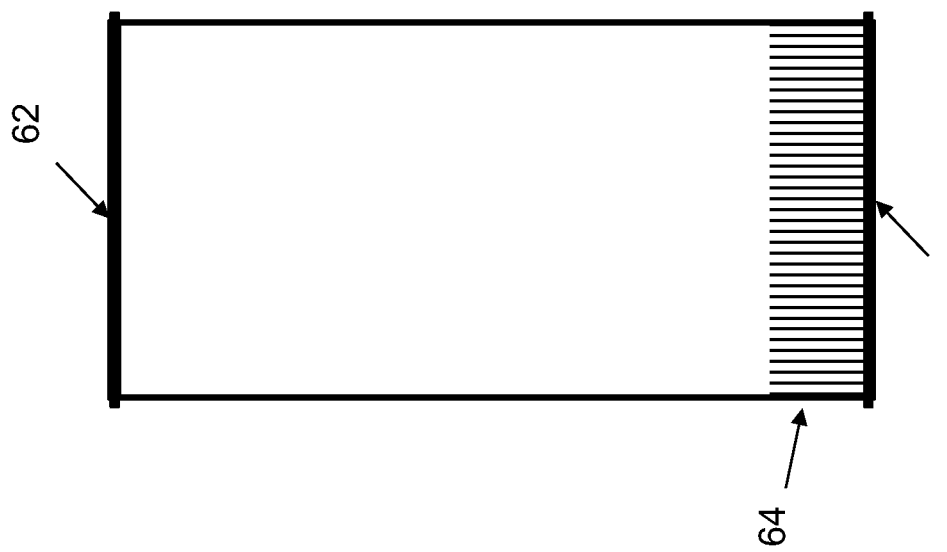
FIG. 5 shows a cut-away view of a flat plate solar collector through the thermosyphon flow path layer.

FIG. 5 shows a cut-away view of the collector through the thermosyphon flow path layer. The rectifier fluidic diodes 64, one for each thermosyphon heat dump flow path, occupy approximately the bottom 1 foot of the thermosyphon heat dump flow paths.

Referring to FIGS. 3, 4 and 5, under forced circulation, flow is upward through the channels in the heat absorbing layer 53, and no flow is going through the thermosyphon heat dump flow paths 55 because the upward flow is impeded by the fluidic diodes. When forced circulation stops, natural circulation commences with upward flow continuing through the channels in the heat absorbing layer 53 and now downward flow through the channels in the thermosyphon heat dump layer 55 on the other side of the insulation 54. Overheating is averted by the natural circulation that is cooling the working fluid through the dumping of heat to the ambient air.

No external heat dumps are required for this design, and the design has much better aesthetics. Further, the design can be implemented in plastic because the collector can cool itself when forced circulation stops. During forced circulation, overheat protection must be provided separately from the present invention either by a separate overheat protection device or by a control system capable of sensing overheating and stopping forced circulation to allow the present invention to assume the overheat protection function.

Figure 6:
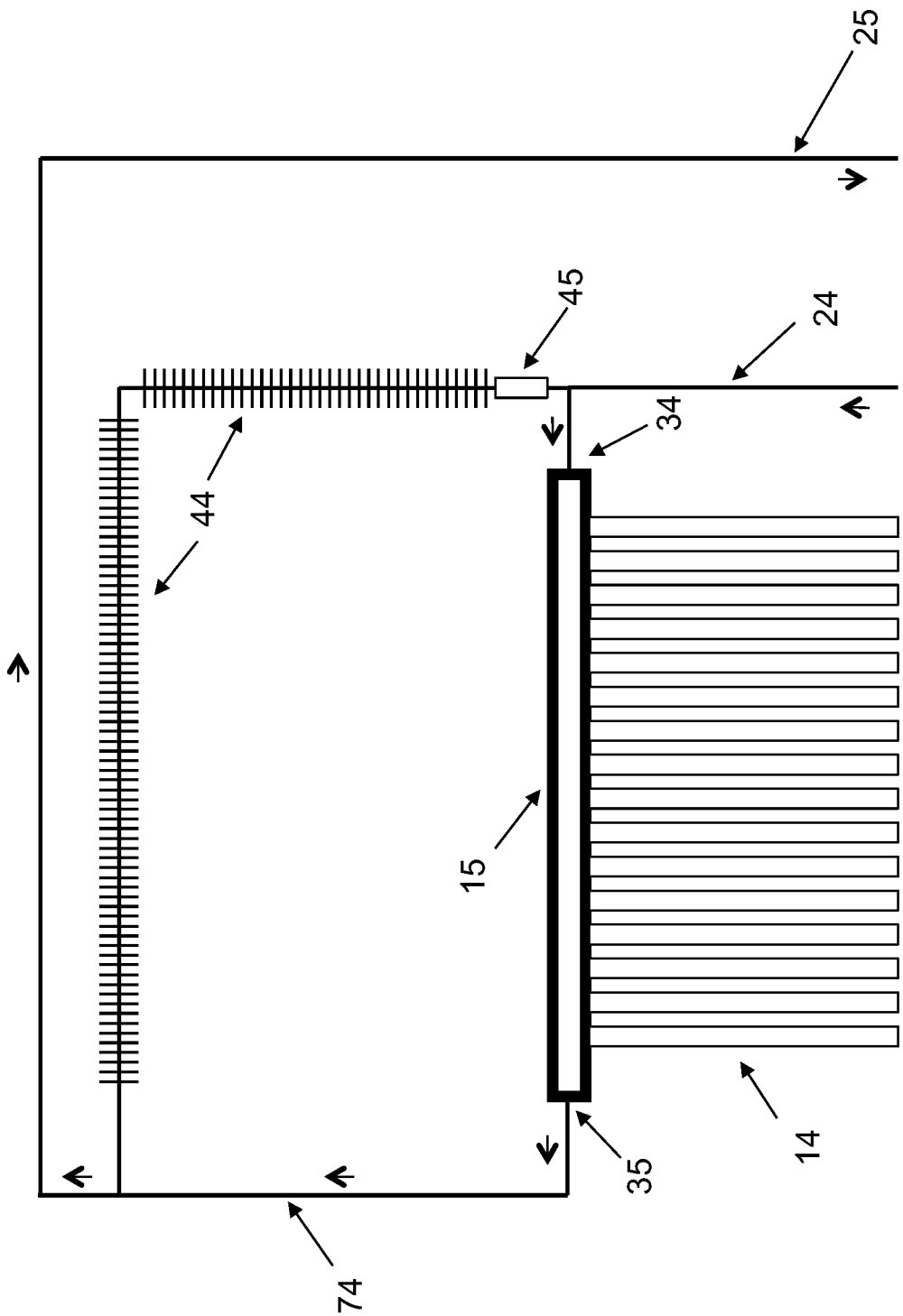
FIG. 6 shows a schematic for an evacuated tube solar collector and a parallel thermosyphon heat dump flow path with flow indicated for forced circulation.
Figure 7:
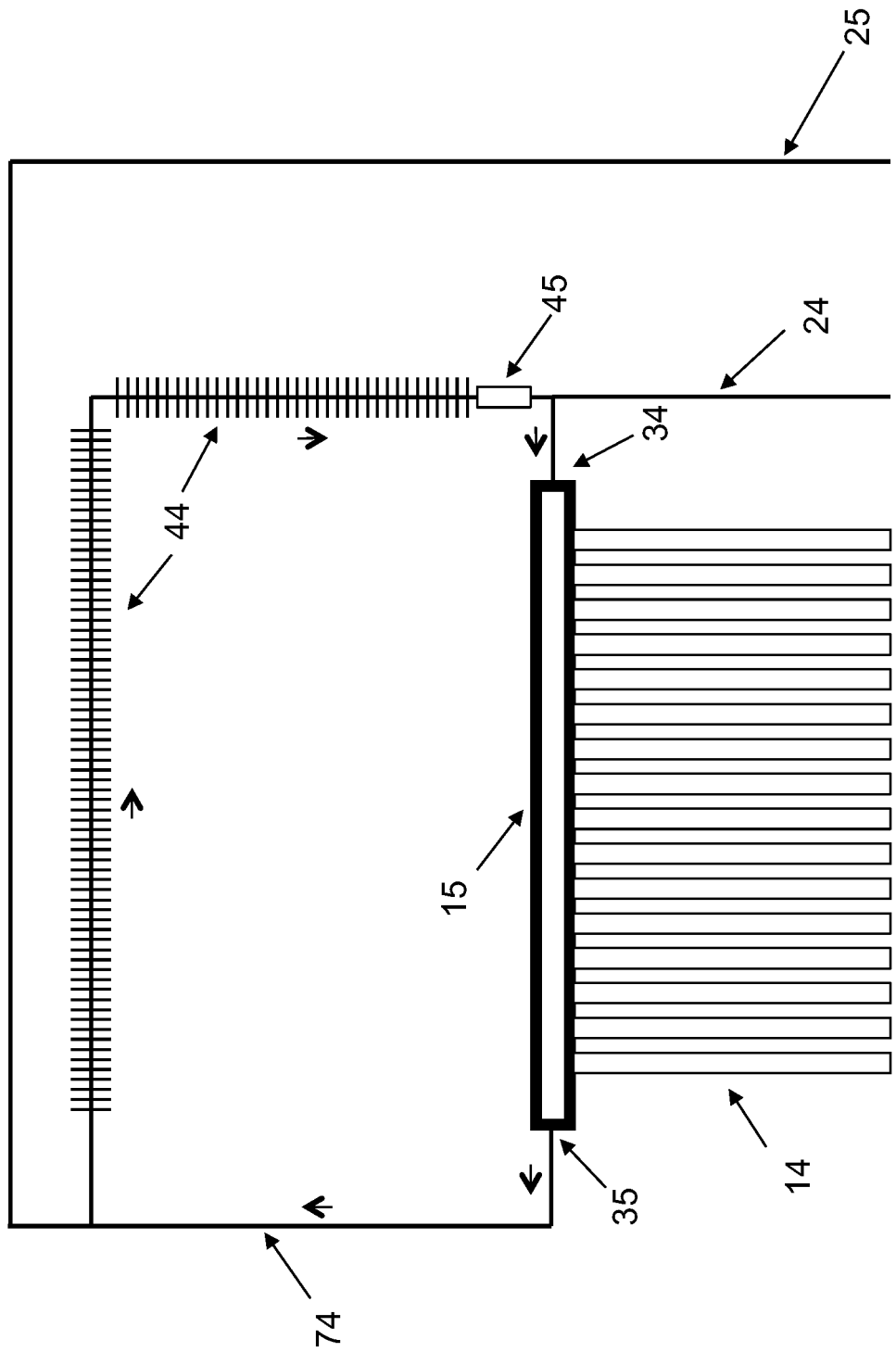
FIG. 7 shows a schematic for an evacuated tube solar collector and a parallel thermosyphon heat dump flow path with flow indicated for natural circulation.

As shown in FIGS. 6 and 7, evacuated-tube solar collectors can also be protected from overheating with the present invention even though flow through the heat source is horizontal. The outlet 35 of the horizontal manifold 15 is extended upward with piping in the same manner as for the shallow flat plate collector described above. This piping extension 74 provides a vertical hot fluid section for the generation of additional buoyancy that drives thermosyphoning.

FIG. 6 shows a schematic of the present invention for an evacuated tube solar collector in forced-circulation. Only the supply piping 24 to the solar collector, return piping 25 from the solar collector, the evacuated tubes 14, the manifold 15 to which the evacuated tubes 14 are attached, the inlet to the manifold 34, the outlet from the manifold 35, the heat dump 44, and the fluidic diode 45 are shown in the figure. The balance of the closed-loop fluidic system that typically includes a pump, an expansion tank and the like are not shown. The thermosyphon heat dump flow path is comprised of the heat dump component 44 and the fluidic diode component 45. All piping except for the thermosyphon heat dump flow path is insulated.

During forced-circulation operation, fluid flows from the supply piping 24 into the manifold inlet 34. Flow does not go through the fluidic diode 45 because the flow in this direction is impeded. There is no flow through the thermosyphon heat dump flow path 44 and 45. Fluid in this flow path 44 and 45 is stagnant and cool relative to the fluid in the manifold. Flow continues through the manifold 15 that heats the fluid, then exits at the manifold outlet 35, and then goes upward through the piping extension 74. Flow continues to the return piping 25 from the solar collector.

FIG. 7 shows the same schematic but for the situation in which forced circulation has ceased. There is no flow in the supply piping 24 or the return piping 25. However, there is now natural circulation flow, or thermosyphoning, through the manifold 15, up through the insulated piping extension 74 and down through the thermosyphon heat dump flow path 44 and 45. The fluidic diode 45 now allows flow through in the opposite direction from forced circulation flow. With the heat dump 44 sized to disperse to air as much heat as the solar collector is gaining from the sun, the natural circulation will continue and by so doing will limit the fluid temperature and prevent overheating.

Many other embodiments of the present invention are possible. Another embodiment is a boiler that requires overheat protection during a loss of forced circulation. Another embodiment is a chemical reactor with a cooling jacket that could overheat with a loss of forced circulation. One skilled in the art will recognize that the present invention can be utilized in embodiments beyond solar collectors.

4. How to Make the Present Invention

When adding the present invention to a conventional solar collector, the invention can be plumbed behind or along the edges of the solar collector or connected solar collectors. One-inch copper pipe is typically used. The heat dump is typically finned tubes, such as copper pipe with aluminum fins. The solar collector outlet is extended vertically if necessary to promote thermosyphoning with insulated copper pipe. The inlet to the heat dump is connected to this extension or to the outlet itself. The heat dump is plumbed to the fluidic diode, and the fluidic diode is then plumbed to the inlet to the solar collector or to an extension of the inlet, thus creating one or more thermosyphon heat dump flow paths parallel to the flow paths through the solar collector. In some cases the finned tube heat dump and the fluidic diode can be integrated together with a section of the finned tubing housing a rectifier or scroll fluidic diode.

The plastic collector embodiment described above can be produced by additive manufacturing or by conventional plastic extrusion and injection molding. The body of the collector can be extruded. A sheet of insulation is inserted into the extrusion. The top and bottom headers can be injection molded and then glued or plastic welded to the extrusion. Glazing would be produced separately and secured onto the plastic collector.

5. Best Mode

The best mode of the present invention utilizes a passive heat dump, has no moving parts, and requires no power source. This mode has the highest reliability and affords the greatest design and installation flexibility.

What is claimed is:

1. A method for cooling fluid at a solar thermal collector in a closed-loop fluidic system by thermosyphoning, comprising:
   impeding fluid flow through a heat-dissipating flow path during forced circulation with a fluidic diode;
   allowing fluid flow through the heat-dissipating flow path in the absence of forced circulation with the fluidic diode; and
   in the absence of forced circulation, dissipating heat acquired by the solar thermal collector along the heat-dissipating flow path to generate a fluid density difference that promotes thermosyphoning.

2. A solar thermal collector system that cools fluid in a closed-loop fluidic system by thermosyphoning, comprising:
   a solar thermal collector;
   a solar-heat-absorbing flow path of said collector;
   an inlet to said path;
   an outlet from said path; and
   a thermosyphon heat exchange flow path comprising;
   a heat-dissipating flow path; and
   a fluidic diode;
whereby on the cessation of forced circulation, thermosyphoning begins and the fluid temperature is limited.

3. The solar thermal collector system according to claim 2 wherein the thermosyphon heat exchange flow path is interposed between a) the outlet or an extension of the outlet of the solar-heat-absorbing flow path and b) the inlet or an extension of the inlet of the solar-heat-absorbing flow path.

4. The solar thermal collector system according to claim 3 further including insulation between the solar-heat-absorbing flow path and the thermosyphon heat dump flow path.

5. The apparatus according to claim 3 wherein the heat-dissipating flow path is integrated into the solar collector.

6. The apparatus according to claim 3 wherein the heat-dissipating flow path is separate from the solar collector.

* * * * *